United States Patent
Kasaiezadeh Mahabadi et al.

(10) Patent No.: US 10,597,028 B2
(45) Date of Patent: Mar. 24, 2020

(54) SYSTEMS AND METHODS FOR HOLISTIC VEHICLE CONTROL WITH COLLABORATIVE STEERING, ELECTRONIC LIMITED SLIP DIFFERENTIAL (ELSD), POWERTRAIN AND BRAKING

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Shih-Ken Chen, Troy, MI (US); Bakhtiar B. Litkouhi, Washington, MI (US); Nikolai K. Moshchuk, Grosse Pointe, MI (US); Patrick J. Monsere, Highland, MI (US); Edward T. Heil, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 15/622,599

(22) Filed: Jun. 14, 2017

(65) Prior Publication Data
US 2018/0362022 A1 Dec. 20, 2018

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/18* (2013.01);
(Continued)

(58) Field of Classification Search
CPC ............. B60W 30/045; B60W 50/029; B60W 40/114; B60W 40/105; B60W 40/101; B60W 30/08; B60W 10/20; B60W 10/18; B60W 10/04; B60W 2520/26; B60W 2520/14; B60W 2510/202; B60W 2050/0295; B60W 2050/0039; B60W 50/00; B60W 10/16; B60W 2520/20;
(Continued)

(56) References Cited

U.S. PATENT DOCUMENTS

| | | | | |
|---|---|---|---|---|
| 7,734,406 B1 * | 6/2010 | Oppenheimer | ......... | B60T 8/885 180/197 |
| 2012/0055744 A1 * | 3/2012 | Chen | ....................... | B60T 8/267 188/106 P |

* cited by examiner

*Primary Examiner* — Genna M Mott
(74) *Attorney, Agent, or Firm* — Lorenz & Kopf, LLP

(57) ABSTRACT

A method and system for controlling a vehicle to improve vehicle dynamics are provided. The method includes receiving data from a plurality of sensors which monitor vehicle dynamics by monitoring at least wheel and steering movements associated with a vehicle system used in controlling vehicle dynamics by control outputs from a holistic vehicle control system. Then, estimating states of the vehicle from computations of longitudinal and latitudinal velocities, tire slip ratios, clutch torque, axle torque, brake torque, and slip angles derived from the data sensed by the sensors from the wheel and steering movements. Finally, formulating a model of vehicle dynamics by using estimations of vehicle states with a target function to provide analytical data to enable the model of vehicle dynamics to be optimized and for using the data associated with the model which has been optimized to change control outputs to improve in real-time the vehicle dynamics.

20 Claims, 9 Drawing Sheets

(51) Int. Cl.
*B60W 10/18* (2012.01)
*B60W 10/20* (2006.01)
*B60W 30/08* (2012.01)
*B60W 40/101* (2012.01)
*B60W 40/105* (2012.01)
*B60W 40/114* (2012.01)
*B60W 50/029* (2012.01)

(52) U.S. Cl.
CPC ............ *B60W 10/20* (2013.01); *B60W 30/08* (2013.01); *B60W 40/101* (2013.01); *B60W 40/105* (2013.01); *B60W 40/114* (2013.01); *B60W 50/029* (2013.01); *B60W 2050/0295* (2013.01); *B60W 2510/202* (2013.01); *B60W 2520/14* (2013.01); *B60W 2520/26* (2013.01)

(58) Field of Classification Search
CPC ......... B60W 2540/18; B60W 2520/10; B60W 2050/0088; B60W 2050/0031; B60W 2520/12; B60W 10/184
See application file for complete search history.

SYSTEMS AND METHODS FOR HOLISTIC VEHICLE CONTROL WITH COLLABORATIVE STEERING, ELECTRONIC LIMITED SLIP DIFFERENTIAL (ELSD), POWERTRAIN AND BRAKING

TECHNICAL FIELD

The technical field generally relates to control systems of a vehicle and more particularly to methods and systems for controlling actuator devices of a vehicle to improve vehicle handling and stability.

BACKGROUND

Holistic vehicle control (HVC) methodology may be considered an extension of Holistic Corner Controller (HCC) methodology. Whereas HCC methodology is generally directed to dynamically redistributing tire forces between wheels for vehicle control; HVC methodology is directed to determining the actual individual contributions in vehicle systems using real-time data of each actual physical actuator operating during running of a production vehicle. That is, the physical assistance of each of the produced commercial actuators while in use may have either "opposing" or "collaborative" contributions to the efficacious operations of the vehicle system when viewed with respect to the other actuators performance in the vehicle system when executing a particular task or tasks. These types of individual contributions whether positive or negative of the individual actuators are not realized without using HVC methodologies.

Therefore, it is desirable, given the need for optimal vehicle performance, to make more available the HVC methodologies by generating virtual models of vehicle dynamics for stability and path control, particularly in autonomous vehicles, by defining target goals where realized errors of differences in measured metrics of desired vehicle performance versus actual vehicle dynamics are minimized.

It is desirable to derive sets of optimal empirical solutions for real-time sensing of actual states of the vehicle operations measured or compared against the HVC virtual modeling of these operations to adjust or pre-set the actuator assignments of the vehicle system.

It is desirable to provide improved methods and systems for compensating for vehicle component failures thereby mitigating any resulting undesired performance effects in the vehicle operation. That is, often there are redundant suites of actuators used in vehicle operations which may pose control allocation problems when selecting appropriate sets of actuator to respond to forces or moments detected and further certain actuators may fail or have failed during a vehicle operation.

Therefore, it is desirable to use the HVC virtual modeling and subsequent command transforms to make control selections and decisions of which actuators to use of a redundant actuator set. With respect to failed components, it is desirable to use comparisons of the HVC virtual modeling of vehicle dynamics with actual results to recognize failures of actuators such as electronic limited slip differential (eLSD), powertrain, electronic power steering (EPS) actuator failures, and compensate selectively with different actuators assignments.

It is further desirable to provide methods and systems for determining the control commands using feedback information from the steering, braking, eLSD, and power train vehicle systems.

Current systems may not always provide adequate solutions for a secure, robust and data distribution and interoperable exchange between participants and data providers. Accordingly, it is desirable to provide systems and methods which address these shortcomings. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for controlling components of a vehicle. In one embodiment, a method includes: generating, by a processor, a model of vehicle dynamics based on analytical optimized solutions; determining, by a processor, a control output based on the model of vehicle dynamics; and selectively controlling, by a processor, at least one component associated with at least one of a wheel system, a steering system, eLSD, braking and powertrain of the vehicle based on the control output.

In another embodiment, the method for controlling a vehicle to improve vehicle dynamics includes: receiving data from a plurality of sensors which monitor vehicle dynamics by monitoring at least wheel movements associated with a vehicle system used in controlling vehicle dynamics by control outputs from a holistic vehicle control system. Then, estimating states of the vehicle from computations of one or more of longitudinal and latitudinal velocities, yaw rate and slip angles derived from the data sensed by the sensors from the wheel and/or steering movements. Further, formulating a model of vehicle dynamics by using estimations of vehicle states with a target function to provide analytical data to enable the model of vehicle dynamics to be optimized and for using the data associated with the model which has been optimized to change control outputs of the holistic vehicle control system to improve in real-time the vehicle dynamics.

In addition, the control outputs includes selectively controlling at least one actuator associated with at least one of the holistic vehicle control system where the holistic vehicle control system includes one or more of a wheel control system, a powertrain and a steering control system. Further, the control outputs include actuator commands generated by the holistic vehicle control system for controlling at least one of the actuators of the vehicle system. The vehicle system includes one or more of an electronic power steering (EPS) system, a differential braking (DB) system, an electronic limited slip differential (eLSD) system, and a braking system.

The method further includes determining an available actuator of at least one of the vehicle systems and wherein the determining the control output is based on the available actuators. Also, the determining the available actuators is based on a failure condition associated with at least one actuator. The holistic vehicle control system includes applying constraints to the controls of the holistic vehicle systems for the actuator determined to have the failure condition and applying pre-set weighting functions to actuators determined not to have the failure condition. The control output minimizes an error between desired dynamics and actual dynamics. The formulating the model includes formulating a model of vehicle dynamics based on a target function associated with vehicle dynamics, wherein the determining the control output comprises determining the control output based on the model of vehicle dynamics which has been optimized for the vehicle associated with one or more of the following vehicle system data of a wheel, a steering, an eLSD, a braking and a powertrain system, and wherein the selectively controlling comprises controlling at least one component associated with at least a vehicle system of the vehicle based on the respective control output.

In another embodiment, the system includes controlling a component of a vehicle, including a non-transitory computer readable medium including a first module that generates, by a processor, a model of vehicle dynamics based on sensor information, a second module that determines, by a processor, a control output based on the model of vehicle dynamics for values commutated by a target function of wheel dynamics and controls of actuators, and a third module that selectively controls, by a processor, at least one component associated with at least one of the actuators of a wheel, eLSD, powertrain, braking or steering system of the vehicle based on the control output.

The system further includes a fourth module that determines available actuators of at least one of the wheel, eLSD, powertrain, braking and steering system, and wherein the second module determines the control output based on the available actuators. The fourth module determines the available actuators based on a fault condition associated with at least one of the actuators. The control output minimizes an error between desired dynamics and actual dynamics. The target function includes force and moment errors associated with the vehicle dynamics. The wheel dynamics includes at least tire slip.

In another embodiment, the system includes at least one processor; and at least one computer-readable storage device comprising instructions that when executed causes performance of a method for modeling vehicle dynamics, the method includes receiving data from a plurality of sensors which monitor vehicle dynamics by monitoring at least wheel and steering movements associated with a vehicle system used in controlling vehicle dynamics by control outputs from a holistic vehicle control system. Then, estimating states of the vehicle from computations of one or more of the following: longitudinal and latitudinal velocities, clutch torque, eLSD, brake torque, axle torque, tire slip ratios and slip angles derived from the data sensed by the sensors from the wheel and/or steering movement. Finally, formulating a model of vehicle dynamics by using estimations of vehicle states with a target function to provide analytical data to enable the model of vehicle dynamics to be optimized and for using the data associated with the model which has been optimized to change control outputs of the holistic vehicle control system to improve in real-time the vehicle dynamics.

The control outputs include selectively controlling at least one actuator associated with at least one of the holistic vehicle control system wherein the holistic vehicle control system comprises at least a wheel control system and/or a steering control system. The control outputs include actuator commands generated by the holistic vehicle control system for controlling at least one of the actuators of the vehicle system. The vehicle system comprises one or more of an electronic power steering (EPS) system, a differential braking (DB) system, an electronic limited slip differential (eLSD) system, and a braking system.

The formulating the model includes formulating a model of vehicle dynamics based on a target function associated with vehicle dynamics, wherein the determining the control output comprises determining the control output based on the model of vehicle dynamics which has been optimized for the vehicle associated with one or more of the following vehicle system data of a wheel, a steering, an eLSD, a braking and a powertrain system, and wherein the selectively controlling comprises controlling at least one component associated with at least a vehicle system of the vehicle based on the respective control output.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
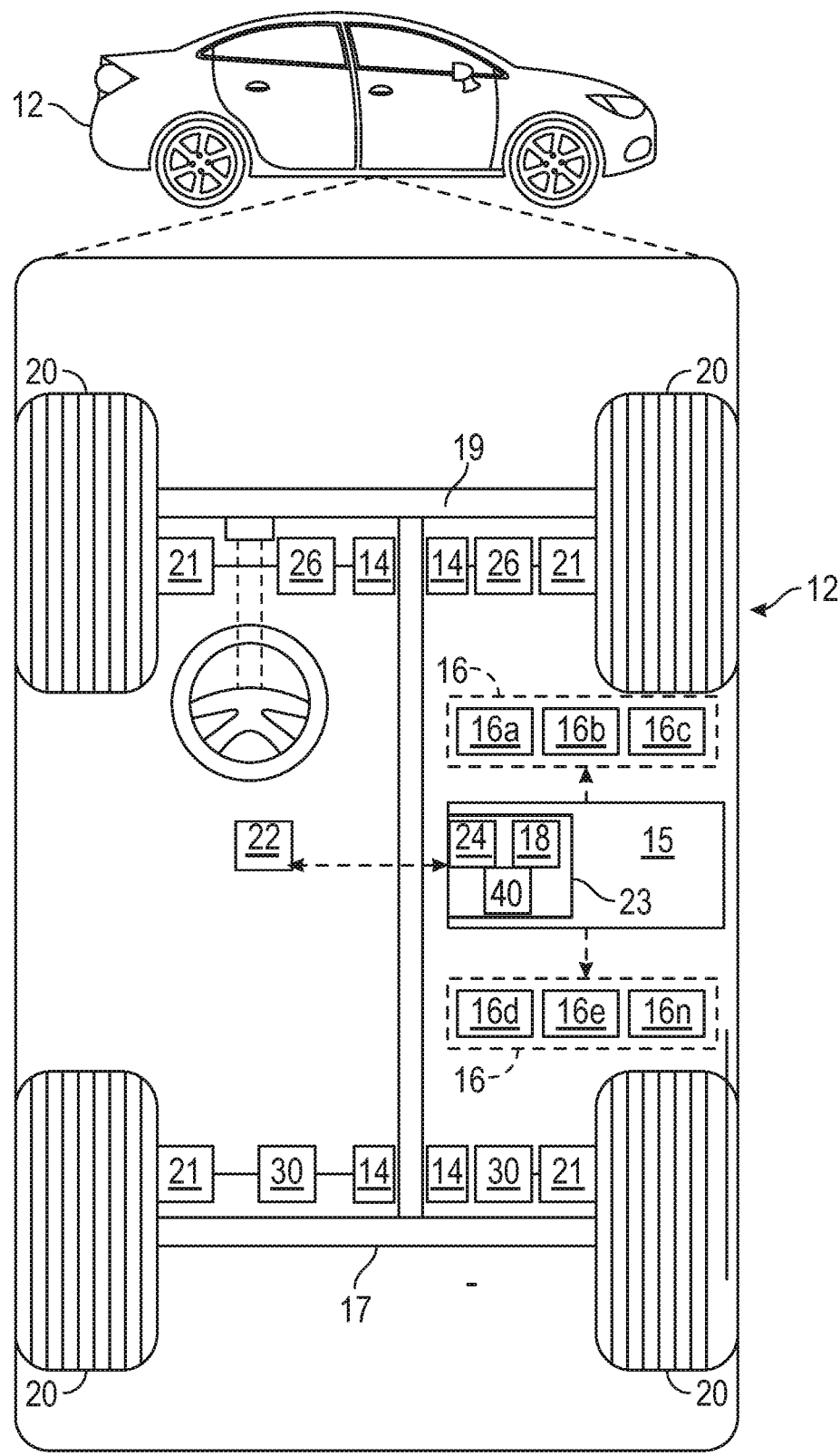
FIG. 1 is a functional block diagram of a vehicle that includes a holistic vehicle control system in accordance with various embodiments.

The following detailed description is merely exemplary in nature and is not intended to limit the application and uses. Furthermore, there is no intention to be bound by any expressed or implied theory presented in the preceding technical field, background, summary or the following detailed description. Throughout the drawings, corresponding reference numerals indicate like or corresponding parts and features. As used herein, the word "exemplary" means "serving as an example, instance, or illustration." Any implementation described herein as exemplary is not necessarily to be construed as preferred or advantageous over other implementations.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Active safety systems or chassis control systems are designed to improve a vehicle's handling, for example at the limits where the driver might lose control of the motor vehicle. The systems compare the driver's intentions, for example, by direction in steering, throttle, and/or DB inputs, to the motor vehicle's response, via lateral acceleration, rotation (yaw) and individual wheel speeds. The systems then control the vehicle, for example, by DB individual front or rear wheels, by EPS the wheels, and/or by reducing excess engine power as needed to help correct understeer (plowing) or oversteer (fishtailing).

HVC can be used in conjunction with active safety systems and can determine by virtual modeling optimal levels of operation of aspects of a vehicle, by transforming sets of virtual control commands from the HVC virtual modeling of vehicles and wheel dynamic and kinetic states, the optimal levels of operation can be ascertained and actual command controls for the optimal level can be generated. That is, such actual command controls can be generated from executing transforms of associated virtual commands derived from actual sets of operable actuators in current use in the wheels, EPS and DB. In addition, HVC can use an expanded set of actuators mainly used for chassis control, stability and performance enhancements.

For example, when a set of actuators which may include EPS and DB actuators, is made available; feedback from the vehicle sensors provide information about vehicular body acceleration and tire forces which enable the HVC system to calculate compensating control actions and thereby making decisions on operating states of the actuator sets for use in EPS and DB operations.

In addition, in a similar manner, when the set of actuator which may include eLSD, braking, and power-train actuators are made available; feedback from the sensors in split friction also known as a split-mu condition and HVC control enabled for all three sets of actuators of eLSD, braking and power-train can be used to better control the wheel slip ratio. In such instances, HVC control of eLSD is prioritized to minimize vehicle deceleration for optimal contribution of the each of the actuators of the actuator sets to be achieved.

With reference now to FIG. 1, a vehicle 12 is shown to include a holistic vehicle control system in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

The vehicle 12 may be configured as a hybrid electric vehicle (HEV) or a battery electric vehicle (BEV) where both the HEV and BEV may have one or more electric motors 14, rear axles 17, front axles 19, and wheels 20 used in the autonomous or hybrid vehicle 12 operations.

When using multiple electric motors 14 configured as shown, each of the electric motors 14 can individually provide motor torque to a corresponding one of the wheels 20. At each of the wheels 20 in the embodiment shown in FIG. 1, friction brakes are positioned and configured for applying a braking torque of the DB system to the associated wheels 20. Additional friction brakes may also be positioned on the rear axles a configuration which would increase the number of controlled actuators.

The vehicle 12 includes a control module 15 which allocates a set of virtual control commands (v) to the wheels 20 of the vehicle 12, and then maps a set of true/actual torque control commands (u) from the virtual control commands (v). The control module 15 controls one or more components 16a-16n of the vehicle 12. The components 16a-16n may be associated with a chassis system or active safety system of the vehicle 12. For example, the control module 15 controls vehicle components 16a-16n of a DB system, EPS system, and/or other chassis system of the vehicle 12. The vehicle 12 includes a center and four corners, a left front corner, a right front corner, a left rear corner, and a right rear corner. The components 16a-16n are associated with each of the four corners to control the operation of the vehicle 12 at the respective corner.

In various embodiments, the control module 15 includes at least one processor 18, memory 40, and one or more input and/or output (I/O) devices 22. The I/O devices 22 communicate with one or more sensors 21 and/or actuators 26, 30 associated with the components 16a-16n of the vehicle 12. The memory 40 stores instructions that can be performed by the processor 18. The instructions stored in memory 40 may include one or more separate programs, each of which comprises an ordered listing of executable instructions for implementing logical functions.

In the example of FIG. 1, the instructions stored in the memory 40 are part of a main operating system 24. The main operating system 24 includes logic for controlling the performance of the control module 15 and provides scheduling, input-output control, file and data management, memory management, and communication control and related services. In various embodiments, the instructions are further part of the control module 15 described herein.

When the control module 15 is in operation, the processor 18 is configured to execute the instructions stored within the memory 40, to communicate data to and from the memory 40, and to generally control operations of the vehicle 12 pursuant to the instructions. The processor 18 can be any custom made or commercially available processor, a central processing unit (CPU), an auxiliary processor among several processors associated with the control module 15, a semiconductor based microprocessor (in the form of a microchip or chip set), a microprocessor, or generally any device for executing instructions.

In various embodiments, the processor 18 executes the instructions of the holistic based control system in the control module 15. The holistic vehicle control (HVC) system in the control module 15 generally determines one or more states of motion of the vehicle 12 given the driver's intent (as indicated by one or more sensors associated with the DB system and/or EPS system). The holistic vehicle control system in the control module 15 determines one or more control commands based on tire force estimations, actuator availability, and optimization methods for a target function of the present disclosure. The control module 15 takes into account the sensed information from the corners of the vehicle when determining by the optimized solution the control commands.

Figure 2:
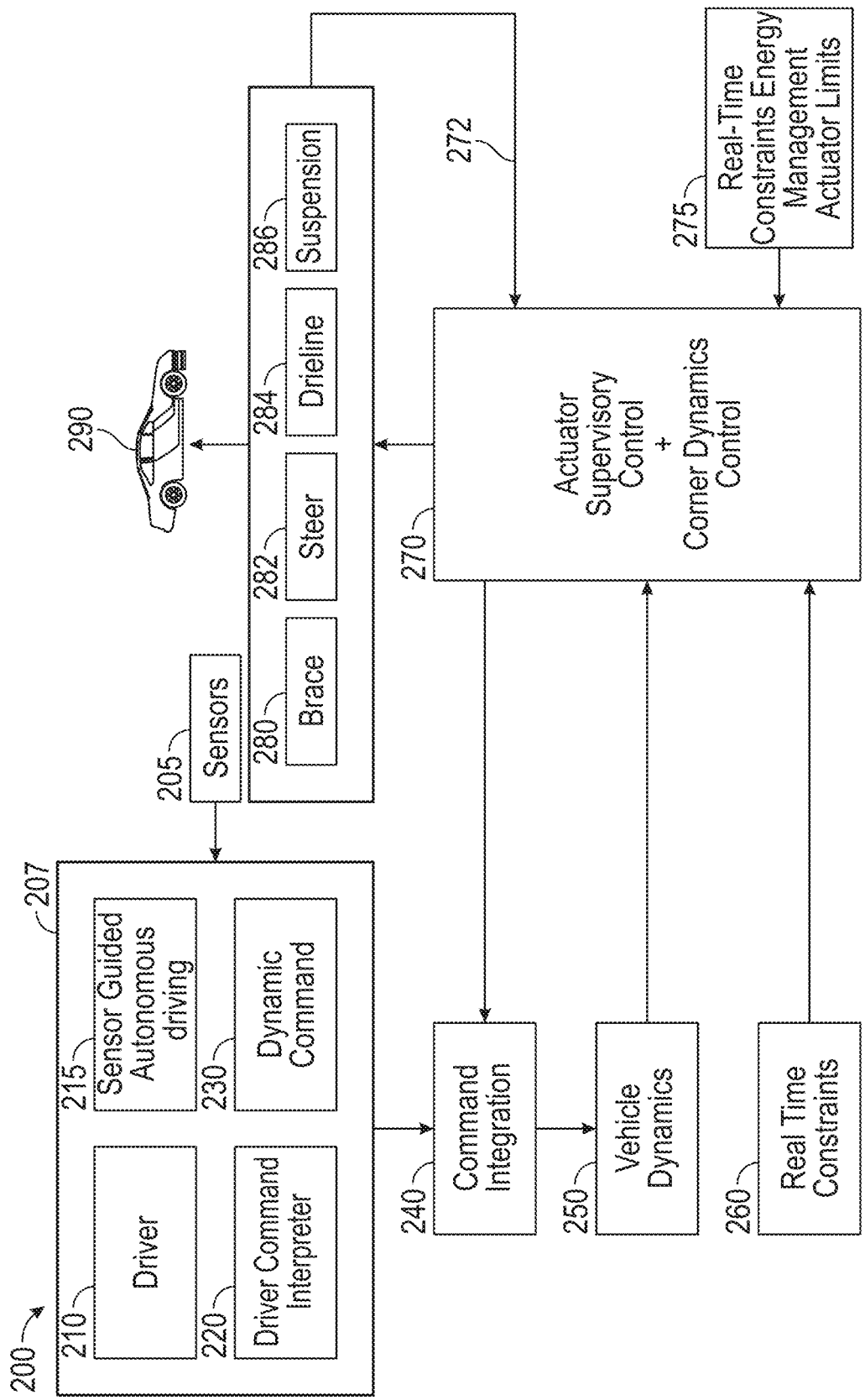
FIG. 2 is a functional block diagram of a vehicle that includes a holistic vehicle control system in accordance with various embodiments.

Referring now to FIG. 2 and with continued reference to FIG. 1, a diagram illustrates the holistic vehicle control system in accordance with various exemplary embodiments. As can be appreciated, various exemplary embodiments of the holistic based vehicle control system, according to the present disclosure, may include any number of modules and/or sub-modules.

In various exemplary embodiments, the modules and sub-modules shown in FIG. 2 may be combined and/or further partitioned to similarly determine a holistic vehicle control command based on actuator supervisory control and corner dynamic control to control actuators of the vehicle based thereon. In various embodiments, the holistic vehicle control system 200 receives inputs from the one or more sensors associated with the components 16a-16n of the vehicle.

In various embodiments, the holistic vehicle control (HVC) module 270 may include the sub modules of a wheel slip command adjustment module, a command blending module, and an actuator control module.

The HVC module 270 includes functions related to the corner dynamic control and the actuator control. The HVC module 270 sends control signals to the DB system 280, the EPS system 282, the driveline 284, and the suspension system 286 for the vehicle control 290. In addition, the HVC module 270 receives data of the states of the actuators of these systems via a feedback path 272. For example, for a particular vehicle task sent to the DB system 280, EPS system 282, driveline 284 and suspension system 286, not all the actuators need be actuated. That is, certain actuators may be redundant and not needed in the task performance and only a limited set of actuators need be actuated to perform the task. In that case, the states of the associated actuators would reflex those which are actuated and those which are not. In addition, when there is determined to be a failure as the various systems are operating at a limit; In such instances, the corresponding sets of actuators needed to perform the task may be considered disabled and an alternative set of actuators is necessary for the task performance. Hence, the resultant states would reflect the states of the redundant actuators not normally in use for the particular task at hand; but rather, the redundant set of actuators may be actuated when there is a failure of the initial actuator or actuators actuated in the performance of the tasks.

The constraint module 275 provides data in real-time of constraints of energy management and actuator limits to the HVC module 270 for actuator supervisory control and to optimize the selection of actuators. Additionally, vehicle dynamic data, that is the desired vehicle dynamics is also fed to the HVC module 270 and used in conjunction of the actuator supervisory control for desired performance of the vehicle control 290 and for optimizing the actuator control with the real time optimization data received. In other words, actuator supervisory control is based on the following: vehicle dynamics desired from the vehicle dynamics module 250, a desired corner force moment distribution from submodules (not shown) of the HVC module 270 for corner dynamic control optimization, energy management, and actuator limits determined by the constraint module 275 which also sends information to the feedback path 272 of the resultant actuator states.

Sensor data from a sensor module 205 which includes data of the vehicle surroundings, obstacles, road conditions, other vehicles, environmental conditions is provided to an interpreter module 207 for further processing. The interpreter module 207 includes submodules of the driver module 210, the sensor guided autonomous driving module 215, the driver command interpreter module 220 and the dynamic command interpreter module 230. The sensor data is used in formulations and command interpretations by the driver command interpreter module 220 and the dynamic command interpreter module 230. From which, commands from both of these modules are integrated by a command integration module 240 with data of resultant vehicle dynamics from the HVC module 270. The command integration module 240 generates a set of commands for a desired vehicle dynamics or kinematics sent to the vehicle dynamics module 250 for determining a vehicle desired moment or force.

The HVC module 270 receives data of the desired vehicle force and moment from the vehicle dynamics module 250 and also from the corner limit module 260 of information of limitations of force available at the corners in real time and generates data by a sub module of the HVC module 270 for the corner dynamic optimization, the resultant vehicle forces, and moments data which is then sent as a feedback to the command integration module 240.

A multi-step approach is formulated for holistic vehicle control. The approach consists of an initial or first step of generating a virtual model using complex mathematical algorithms for generating data describing the dynamics of motion of a vehicle as well as individual dynamics of motion associated with the vehicles wheels. In addition, the computer model includes generated data of operations and states of actuators used in controls systems for controlling operations of the EPS and DB systems of the vehicle.

The next or second step is directed to the minimizing an error between a desired vehicle dynamics and the actual vehicle dynamics determined using real-time data of sensors and feedback from control operations.

The third step and final step determines an optimal solution of settings for the actuators which are available from a group of actuators for actuations in the EPS and DB systems.

When discussing the above three steps, the virtual modeling is taken in respect to holistic vehicle control. Hence, when formulating a holistic vehicle control model, it is necessary to formulate desired motions of dynamics with actual motions and control actions associated with the actual motions in relation to the virtual model.

Figure 3:
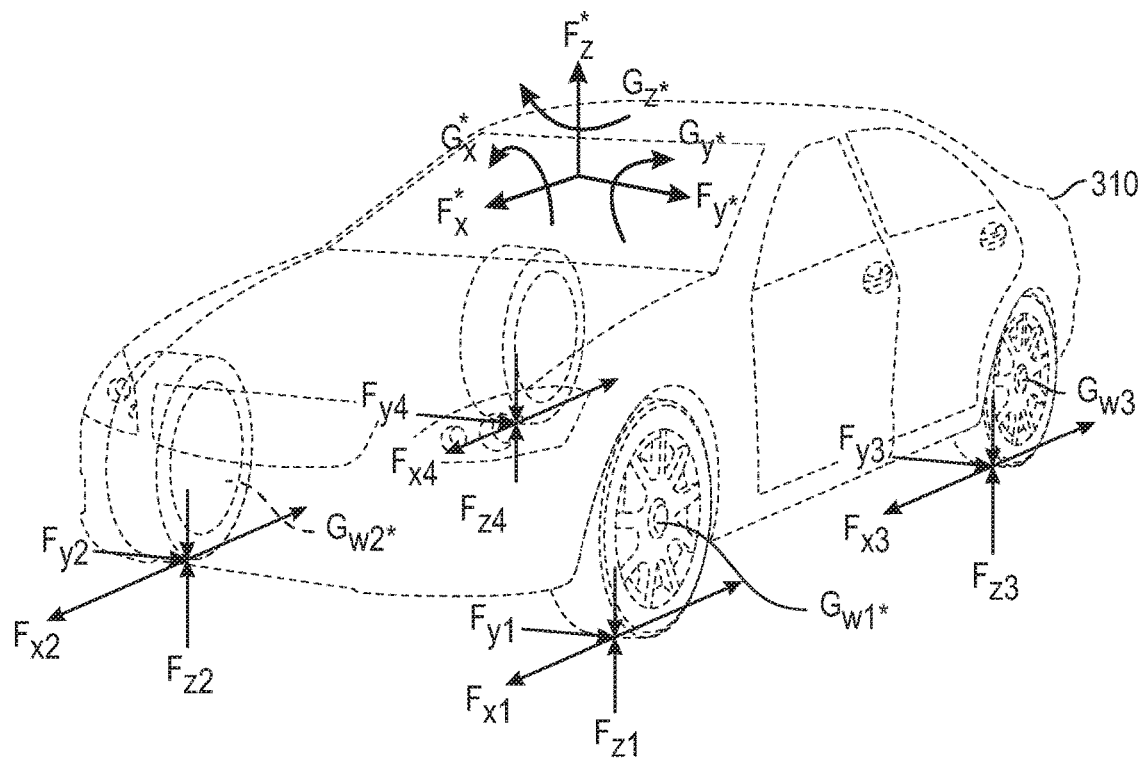
FIG. 3 is an illustration of forces acting upon the vehicle.
Figure 3:
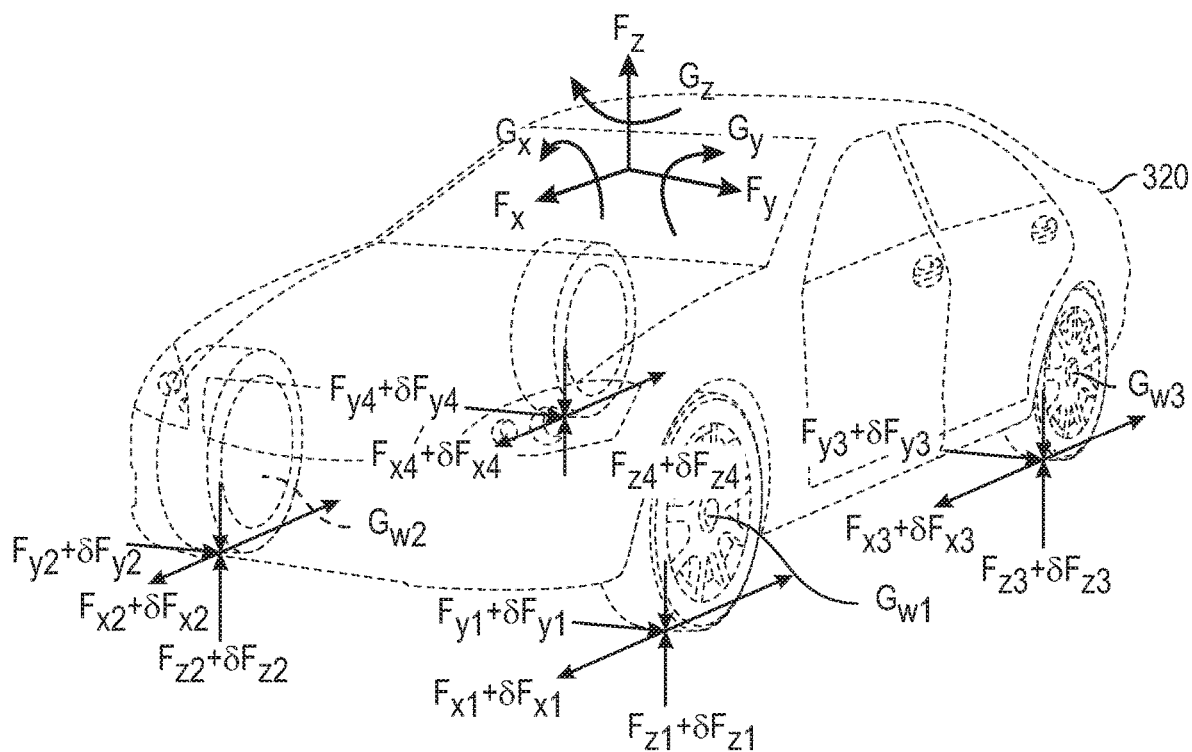

The multi-step approach is also applied to an expanded set of actuators that are mainly used for chassis control, stability and performance enhancements. In a similar manner, virtual model is generated using complex mathematical algorithms resulting in the general math model of vehicle and wheel dynamics as well as the relevant actuator dynamics of the 4 wheels, powertrain, eLSD and brake systems. Next, similarly, a control goal is defined which minimizes the error between desired and actual dynamics. Finally, an optimal solution is determined for the available actuators including eLSD, brakes and power train With a reference to FIG. 3, the general mathematical model of a desired motion in model 310 and an actual motions and control actions in model 320 is shown. The math model determination generates a general math model of the current vehicle dynamics. The general math model in model 310 includes dynamics of each of the wheels and the dynamics of the vehicle body. For example, provided in the illustration in FIG. 3, the math model determination module generates a model 320 with six degrees (or any other number) of freedom: $F_x$, $F_y$, $F_z$, $G_x$, $G_y$, $G_z$ and an objective function which is described which includes a first term of the error terms to be minimized $\frac{1}{2}(E-A_F\delta f)^T W_E(E-A_F\delta f)$ with the added actuator efforts $\frac{1}{2}(\delta f)^T W_{df}(\delta f)$ and finally the actuator constraint $\frac{1}{2}[(f+\delta f)]^T W_{df}[(f+\delta f)]$ which compose the third term.

Hence, the components of the error amounts for minimization are balanced with respect to actuator efforts and the actuator constraints by algorithmic solutions of the HVC module 270 in FIG. 2. The objective function, i.e. the vehicle target dynamics and path, is therefore as follows:

$$P = \frac{1}{2}(E-A_F\delta f)^T W_E(E-A_F\delta f) + \frac{1}{2}(\delta f)^T W_{df}(\delta f) + \frac{1}{2}[(f+\delta f)]^T W_{df}[(f+\delta f)]$$

Once the objective function is determined and the error terms to be minimized and actuator efforts and actuators constraints recognized, then lateral tire forces and aligning moments are determined in relation to slip angles. In stances, dynamics associated with the EPS system is used to estimate the self-aligning moment. That is the yaw moment data and/or the longitudinal and/or the lateral forces in conjunction with tire characteristics are used to determine adjustments for self-aligning of moments.

With the expanded actuator set that controls vehicle dynamics, drive shaft and wheel dynamics, the analytical solution achieved is as follows:

$$\delta f = [W_{df} + A_f^T W_E A_f]^{-1} [A_f^T W_E E]$$

$$|W_{df} + A_f^T W_E A_f| \neq 0$$

Figure 4:
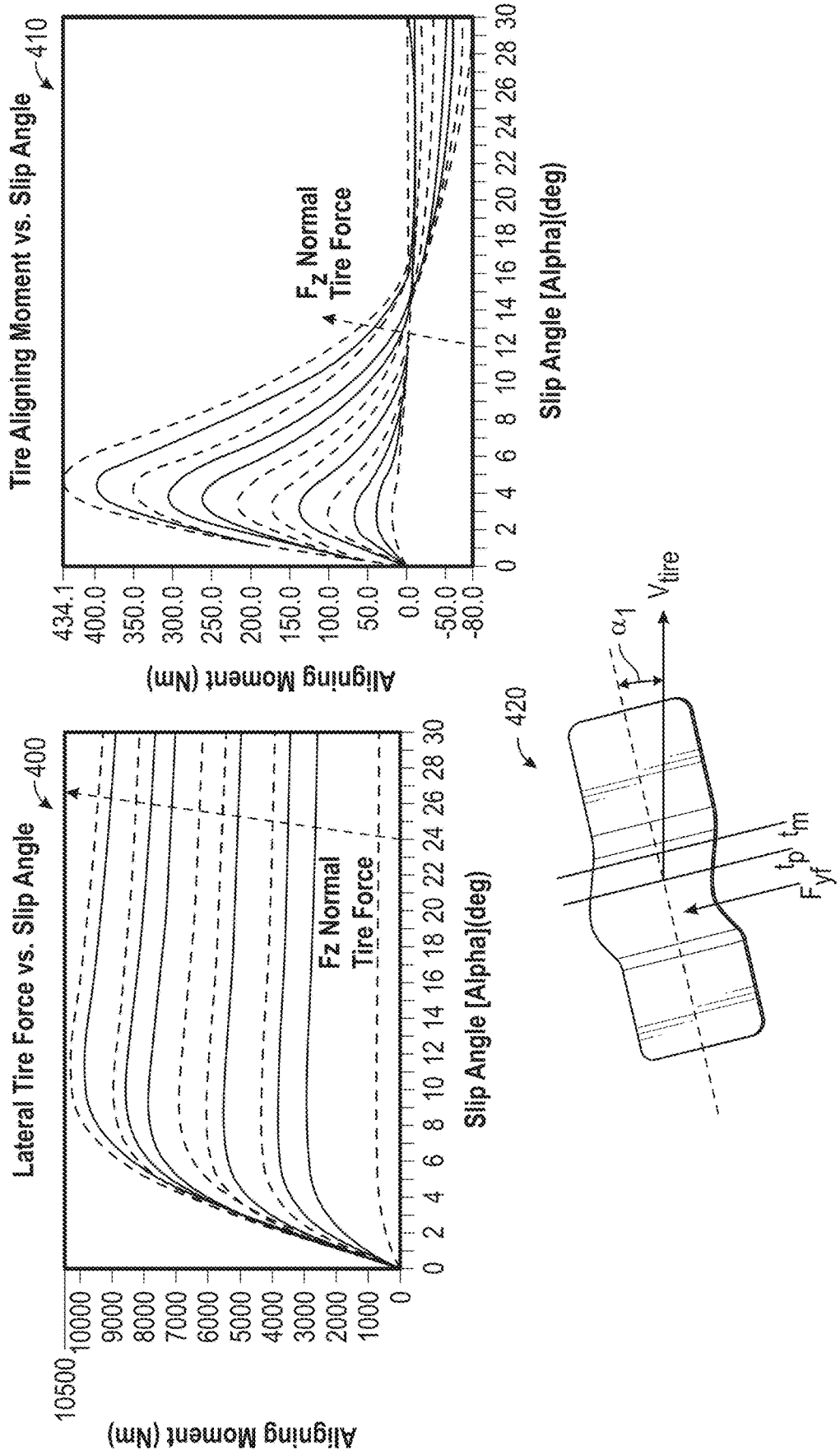
FIG. 4 is an illustration of graphs of forces acting upon the wheel of the vehicle.

With a reference to FIG. 4, FIG. 4 illustrates in graphs 400 and 410 in conjunction with diagram 420 the lateral tire force and tire aligning angle relationships to a slip angle and respective tire forces leading to lateral tire deformation. As the function ($F_z$) of the magnitude changes, a subsequent change occurs as illustrated in graphs 400 and 410 in the self-aligning moment and the lateral tire force.

In FIG. 4, graph 400, illustrates the lateral tire force increase which in turn is shown to increase the slip angle and the magnitude of the function Fz of the normalized tire force both of which are also increased non-linearly. The equation below describes the relationship of various quantities in this system.

$$I_{equ}\ddot{\delta} + C_{equ}\dot{\delta} + K_{equ}\delta = M_{driver} + M_{EPS} + M_{SAT}$$

In FIG. 4, graph 410, illustrates the aligning moment can compensate for the increased lateral tire force, that is by increasing the tire aligning moment amounts, the slip angle is decreased and the normalized function Fz of the tire is decreased. In other words, aligning the tire moments serves to counter the increased tire force effects. The steering system dynamics may be used for estimations of the self-aligning moment, so that the magnitude of the normalized tire force is decreased in conjunction with steering system movements. The relationship of the self-aligning moment and the lateral tire forces is described by the following equation:

$$M_{SAT} = (t_m(\delta) + \hat{t}_p) * \hat{F}_y$$

Figure 5:
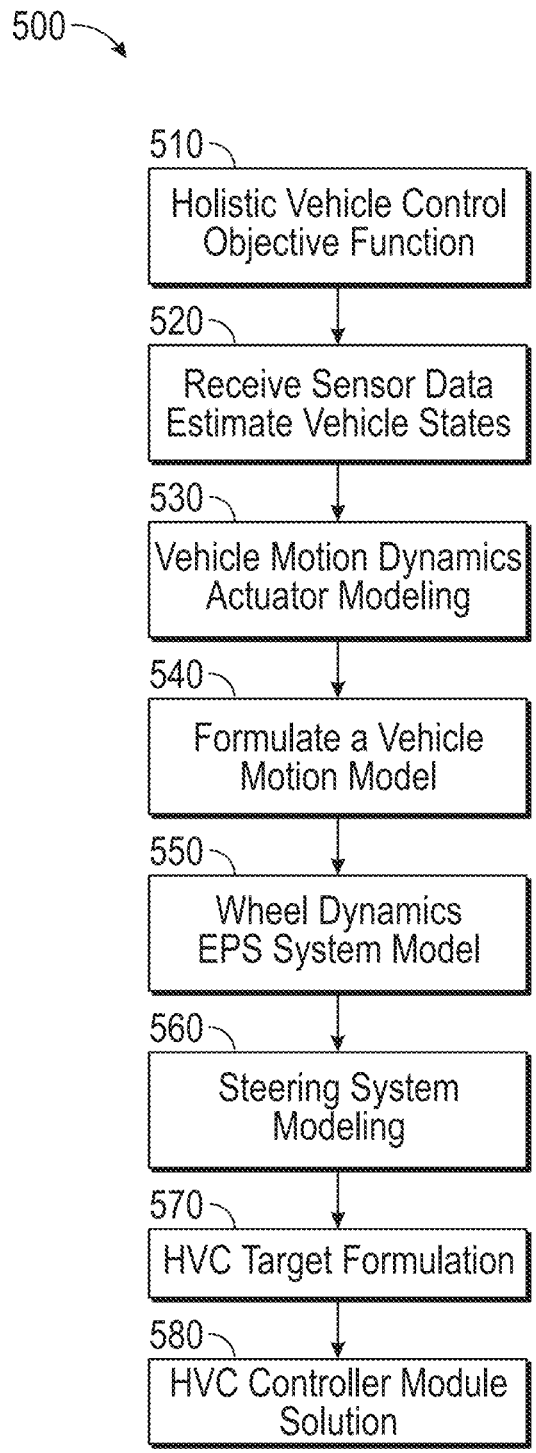
FIG. 5 is a flowchart illustrating control methods in accordance with various embodiments.

With a reference to FIG. 5, in various embodiments the holistic vehicle computer dynamic model with wheel and steering dynamics is formulated. The formulation may begin at 510 where an object function of the holistic control is modeled where the error terms are minimized and actuator terms efforts assessed and actuator constraints defined.

At 520, the yaw moment data and/or the longitudinal and/or lateral forces data, EPS, steering column torque, wheel sensor, steering wheel sensor are received and based on the received data the self-aligning moments are adjusted and estimations of the vehicle states of longitude and latitude velocities and tire slip angles are formulated.

At 530, vehicle motion dynamics is modeled as well as modeling of the vehicle wheels and actuations for the EPS systems and DB systems actuator states.

At 540, the dynamics of the vehicle body are represented by vehicle planar motions which are modeled by a set of expanded vehicle planar motion equations. The dynamics of the math planar model generates a general math model of the current vehicle planar dynamics.

Also at 540, the mathematical algorithms for the model which is formulated also includes dynamics of each of the wheels and the dynamics of the vehicle body. For example, the math model generates an expanded planar model with three degrees (or any other number) of freedom for expanded equations of Fx, Fy, Gz as follows:

$$F_x = \sum_{i=1}^{4}(F_{xi}\cos(\delta_{si}) - F_{yi}\sin(\delta_{si}))$$

$$F_y = \sum_{i=1}^{4}(F_{xi}\sin(\delta_{si}) + F_{yi}\cos(\delta_{si}))$$

$$G_z = a\sum_{i=1,2}(F_{xi}\sin(\delta_{si}) + F_{yi}\cos(\delta_{si})) - b\sum_{i=3,4}(F_{xi}\sin(\delta_{si}) + F_{yi}\cos(\delta_{si})) + w\sum_{2,4}(F_{xi}\cos(\delta_{si}) - F_{yi}\sin(\delta_{si})) - w\sum_{1,3}(F_{xi}\cos(\delta_{si}) - F_{yi}\sin(\delta_{si}))$$

At 550 wheel dynamics and EPS system models are modeled.

The wheel dynamics and EPS system modeled are as follows:

were $G_{wi} = Q_i - R_{eff} \times F_{xi}$ is for wheel dynamics and EPS system model and expanded with EPS and actuator modeling to be:

$$I_{equ}\ddot{\delta} + C_{equ}\dot{\delta} + K_{equ}\delta = M_{driver} \cdot M_{EPS}(t_m(\delta) + \hat{t}_p) * F_{yf}$$

Where $F_{yf} = F_{y1} + F_{y2}$

At 560, the steering system is modeled as follows:

$$\frac{M_{st}}{I_{equ}\ddot{\delta} + C_{equ}\dot{\delta} + K_{equ}\delta} = M_{driver} + M_{EPS} + \frac{t_c}{(t_m(\delta) + \hat{t}_p) * F_{yf}}{G_t}$$

where $F_{yf} = F_{y1} + F_{y2}$ and assuming the EPS is available in front axle configurations only $$F_{y1} + F_{y2} = (M_{st} - M_{driver} - M_{EPS})/t_c$$

At 570, The HVC target formulation is determined as follows:

$$G_t = SAT = I_{equ}\ddot{\delta} + C_{equ}\dot{\delta} + K_{equ}\delta - M_{driver} - M_{EPS}$$

$$\frac{F_{yf}}{F_{zf}} = \frac{F_{y1}}{F_{z1}} = \frac{F_{y2}}{F_{z2}} \rightarrow$$

$$\begin{cases} F_{y1} = \frac{F_{z1}}{F_{zf}} F_{yf} = \frac{F_{z1}}{F_{zf}} \times \frac{(M_{st} - M_{driver} - M_{EPS})}{t_c} = \frac{F_{z1}}{F_{zf}} \times \frac{G_t}{t_c} \\ F_{y2} = \frac{F_{z2}}{F_{zf}} F_{yf} = \frac{F_{z2}}{F_{zf}} \times \frac{(M_{st} - M_{driver} - M_{EPS})}{t_c} = \frac{F_{z2}}{F_{zf}} \times \frac{G_t}{t_c} \end{cases}$$

This assumption is valid in linear regions and additionally provides for approximations for the HVC formulation in the future steps.

At 580, the HVC controller module is defined given the mathematical model which minimizes the error between desired dynamics and actual dynamics. For example, given that the total tire force vector is:

$$f = \{f_{x1}, f_{y1}, f_{x2}, f_{y2}, f_{x3}, f_{y3}, f_{x4}, f_{y4}\}^T,$$

The CG force error vector then is:

$$E = [E_x, E_y, E_z, E_{w1}, E_{w2}, E_{w3}, E_{w4}, E_t]^T = \ldots [F^*_x - F_x, F^*_y - F_y, G^*_z - G_z, G^*_{w1} - G_{w1}, G^*_{w2} - G_{w2}, G^*_{w3} - G_{w3}, G^*_{w4} - G_{w4}, G^*_t - G_t]^T$$

$$u = \{T_{b1}, T_{b2}, T_{b3}, T_{b4}, T_{EPS}\}^T$$

The CG force error adjusted is:

$$F^*_x - F_x(f + \delta f) = F^*_x - \left[F_x(f) + \frac{dF_x(f(u))}{du}\delta u\right] \equiv E_x - \frac{dF_x(f)}{du}\delta u$$

$$F^*_y - F_y(f + \delta f) = F^*_y - \left[F_y(f) + \frac{dF_y(f(u))}{du}\delta u\right] \equiv E_y - \frac{dF_y(f)}{du}\delta u$$

$$\underbrace{G^*_z}_{target} - \underbrace{G_z(f + \delta f)}_{actual\ adjusted} = G^*_z - \left[G_z(f) + \frac{dG_z(f(u))}{du}\delta u\right] \equiv E_z - \frac{dG_z(f)}{du}\delta u$$

$$\underbrace{G^*_{wi}}_{target} - \underbrace{G_{wi}(f + \delta f)}_{actual\ adjusted} = G^*_{wi} - \left[G_{wi}(f) + \frac{dG_{wi}(f(u))}{du}\delta u\right] \equiv E_{wi} - \frac{dG_{wi}(f)}{du}\delta u$$

$$\underbrace{G^*_t}_{target} - \underbrace{G_t(f + \delta f)}_{actual\ adjusted} = G^*_t - \left[G_t(f) + \frac{dG_t(f(u))}{du}\delta u\right] \equiv E_t - \frac{dG_t(f)}{du}\delta u$$

The resulting target HVC function including EPS control and an explanation of this basic relationship is as follows: $A_F^T$ is the Jacobian matrix which is defined below, and B is the contribution matrix that defines the availability of actuators and C is the matrix that defines the vehicle motion.

$A_F^T = B_F \times C_F$ Chain Rule for Matrices where $$B_F = \frac{\partial f}{\partial u} \text{ (Actuator Model)}$$

$$C_F = \frac{\partial F}{\partial f} \text{ (Main Vehicle Model)}$$

Next, the HVC target function which includes the EPS actuator controls, the basic relationship is as follows:

$$P = \frac{1}{2}(E - A_F \delta f)^T W_E (E - A_F \delta f) + \frac{1}{2}(\delta f)^T W_{df}(\delta f)$$

$$B_F = \begin{bmatrix} \frac{\partial f_{x1}}{\partial T_{b1}} & \frac{\partial f_{y1}}{\partial T_{b1}} & \frac{\partial f_{x2}}{\partial T_{b1}} & \frac{\partial f_{y2}}{\partial T_{b1}} & \frac{\partial f_{x3}}{\partial T_{b1}} & \frac{\partial f_{y3}}{\partial T_{b1}} & \frac{\partial f_{x4}}{\partial T_{b1}} & \frac{\partial f_{y4}}{\partial T_{b1}} \\ \frac{\partial f_{x1}}{\partial T_{b2}} & \frac{\partial f_{y1}}{\partial T_{b2}} & \frac{\partial f_{x2}}{\partial T_{b2}} & \frac{\partial f_{y2}}{\partial T_{b2}} & \frac{\partial f_{x3}}{\partial T_{b2}} & \frac{\partial f_{y3}}{\partial T_{b2}} & \frac{\partial f_{x4}}{\partial T_{b2}} & \frac{\partial f_{y4}}{\partial T_{b2}} \\ \frac{\partial f_{x1}}{\partial T_{b3}} & \frac{\partial f_{y1}}{\partial T_{b3}} & \frac{\partial f_{x2}}{\partial T_{b3}} & \frac{\partial f_{y2}}{\partial T_{b3}} & \frac{\partial f_{x3}}{\partial T_{b3}} & \frac{\partial f_{y3}}{\partial T_{b3}} & \frac{\partial f_{x4}}{\partial T_{b3}} & \frac{\partial f_{y4}}{\partial T_{b3}} \\ \frac{\partial f_{x1}}{\partial T_{b4}} & \frac{\partial f_{y1}}{\partial T_{b4}} & \frac{\partial f_{x2}}{\partial T_{b4}} & \frac{\partial f_{y2}}{\partial T_{b4}} & \frac{\partial f_{x3}}{\partial T_{b4}} & \frac{\partial f_{y3}}{\partial T_{b4}} & \frac{\partial f_{x4}}{\partial T_{b4}} & \frac{\partial f_{y4}}{\partial T_{b4}} \\ \frac{\partial f_{x1}}{\partial T_{eps}} & \frac{\partial f_{y1}}{\partial T_{eps}} & \frac{\partial f_{x2}}{\partial T_{eps}} & \frac{\partial f_{y2}}{\partial T_{eps}} & \frac{\partial f_{x3}}{\partial T_{eps}} & \frac{\partial f_{y3}}{\partial T_{eps}} & \frac{\partial f_{x4}}{\partial T_{eps}} & \frac{\partial f_{y4}}{\partial T_{eps}} \end{bmatrix}$$

$$C_F = \begin{bmatrix} \frac{\partial F_x}{\partial f_{x1}} & \frac{\partial F_y}{\partial f_{x1}} & \frac{\partial G_z}{\partial f_{x1}} & \frac{\partial G_{w1}}{\partial f_{x1}} & \frac{\partial G_{w2}}{\partial f_{x1}} & \frac{\partial G_{w3}}{\partial f_{x1}} & \frac{\partial G_{w4}}{\partial f_{x1}} & \frac{\partial G_t}{\partial f_{x1}} \\ \frac{\partial F_x}{\partial f_{y1}} & \frac{\partial F_y}{\partial f_{y1}} & \frac{\partial G_z}{\partial f_{y1}} & \frac{\partial G_{w1}}{\partial f_{y1}} & \frac{\partial G_{w2}}{\partial f_{y1}} & \frac{\partial G_{w3}}{\partial f_{y1}} & \frac{\partial G_{w4}}{\partial f_{y1}} & \frac{\partial G_t}{\partial f_{y1}} \\ \frac{\partial F_x}{\partial f_{x2}} & \frac{\partial F_y}{\partial f_{x2}} & \frac{\partial G_z}{\partial f_{x2}} & \frac{\partial G_{w1}}{\partial f_{x2}} & \frac{\partial G_{w2}}{\partial f_{x2}} & \frac{\partial G_{w3}}{\partial f_{x2}} & \frac{\partial G_{w4}}{\partial f_{x2}} & \frac{\partial G_t}{\partial f_{x2}} \\ \frac{\partial F_x}{\partial f_{y2}} & \frac{\partial F_y}{\partial f_{y2}} & \frac{\partial G_z}{\partial f_{y2}} & \frac{\partial G_{w1}}{\partial f_{y2}} & \frac{\partial G_{w2}}{\partial f_{y2}} & \frac{\partial G_{w3}}{\partial f_{y2}} & \frac{\partial G_{w4}}{\partial f_{y2}} & \frac{\partial G_t}{\partial f_{y2}} \\ \frac{\partial F_x}{\partial f_{x3}} & \frac{\partial F_y}{\partial f_{x3}} & \frac{\partial G_z}{\partial f_{x3}} & \frac{\partial G_{w1}}{\partial f_{x3}} & \frac{\partial G_{w2}}{\partial f_{x3}} & \frac{\partial G_{w3}}{\partial f_{x3}} & \frac{\partial G_{w4}}{\partial f_{x3}} & \frac{\partial G_t}{\partial f_{x3}} \\ \frac{\partial F_x}{\partial f_{y3}} & \frac{\partial F_y}{\partial f_{y3}} & \frac{\partial G_z}{\partial f_{y3}} & \frac{\partial G_{w1}}{\partial f_{y3}} & \frac{\partial G_{w2}}{\partial f_{y3}} & \frac{\partial G_{w3}}{\partial f_{y3}} & \frac{\partial G_{w4}}{\partial f_{y3}} & \frac{\partial G_t}{\partial f_{y3}} \\ \frac{\partial F_x}{\partial f_{x4}} & \frac{\partial F_y}{\partial f_{x4}} & \frac{\partial G_z}{\partial f_{x4}} & \frac{\partial G_{w1}}{\partial f_{x4}} & \frac{\partial G_{w2}}{\partial f_{x4}} & \frac{\partial G_{w3}}{\partial f_{x4}} & \frac{\partial G_{w4}}{\partial f_{x4}} & \frac{\partial G_t}{\partial f_{x4}} \\ \frac{\partial F_x}{\partial f_{y4}} & \frac{\partial F_y}{\partial f_{y4}} & \frac{\partial G_z}{\partial f_{y4}} & \frac{\partial G_{w1}}{\partial f_{y4}} & \frac{\partial G_{w2}}{\partial f_{y4}} & \frac{\partial G_{w3}}{\partial f_{y4}} & \frac{\partial G_{w2}}{\partial f_{y4}} & \frac{\partial G_t}{\partial f_{y4}} \end{bmatrix}$$

Additionally, the HVC target function including EPS control is as follows:

$$B_F = \begin{bmatrix} \frac{-1}{R_1} & 0 & 0 & 0 & 0 & 0 & 0 & 0 \\ 0 & 0 & \frac{-1}{R_2} & 0 & 0 & 0 & 0 & 0 \\ 0 & 0 & 0 & 0 & \frac{-1}{R_3} & 0 & 0 & 0 \\ 0 & 0 & 0 & 0 & 0 & 0 & \frac{-1}{R_4} & 0 \\ 0 & \frac{-f_{z1}}{f_{zf} \times t_c} & 0 & \frac{-f_{z2}}{f_{zf} \times t_c} & 0 & 0 & 0 & 0 \end{bmatrix}$$

$$C_F = \begin{bmatrix} \cos\delta & \sin\delta & -w\cos\delta + L_f\sin\delta & -R_1 & 0 & 0 & 0 & 0 \\ -\sin\delta & \cos\delta & L_f\cos\delta + w\sin\delta & 0 & 0 & 0 & 0 & \frac{f_{zf} \times t_c}{f_{z1}} \\ \cos\delta & \sin\delta & w\cos\delta + L_f\sin\delta & 0 & -R_2 & 0 & 0 & 0 \\ -\sin\delta & \cos\delta & L_f\cos\delta - w\sin\delta & 0 & 0 & 0 & 0 & \frac{f_{zf} \times t_c}{f_{z2}} \\ 1 & 0 & -w & 0 & 0 & -R_3 & 0 & 0 \\ 0 & 1 & -L_r & 0 & 0 & 0 & 0 & 0 \\ 1 & 0 & w & 0 & 0 & 0 & -R_4 & 0 \\ 0 & 1 & -L_r & 0 & 0 & 0 & 0 & 0 \end{bmatrix}$$

w=track/2
$L_f$=CG to Front Axle
$L_r$=CG to Rear Axle
$t_c$=front axle average "total trail"
$L_f$, $L_r$, $T_C$, W, represent distances from the front and rear axles to the CG, front axle trail, and effective radius, respectively.

Further, C represents a matrix of the vehicle dynamics and B represents a contribution matrix that defines the availability of the actuators. For example, the real-time availability of the actuators can depend on failures of any actuator, and/or current vehicle configuration. The failure of any of the actuators can be determined by any fault detection algorithm and reported to the HVC control system. The current vehicle configuration may be automatically configured or configured by a user. For example, the vehicle may be currently operating in four-wheel drive or two-wheel drive (as selected by the driver).

After determining the real-time availability of the actuators, the contribution matrix "B" is reconfigured to include only the available actuators for optimal actuation distribution. For example, the matrix "B" is a diagonal matrix in which each diagonal element corresponds to a particular actuator. Each diagonal element can be either one (available) or zero (not available).

The final solution determination module of a HVC map includes the contribution matrix "B" and vehicle motion matrix C and the control design output.

With a reference to 580, the final HVC analytical solution is achieved which controls vehicles and wheel dynamics and is as follows:

$\delta f = [W_{df} + A_f^T W_E A_f]^{-1} [A_f^T W_E E]$ Assuming that $|W_{df} + A_f^T W_E A_f| \neq 0$ and that the relation is invertible.

With a prior reference now to FIG. 5, the method 500 illustrates various embodiments of a method for determining the HVC map. In various embodiments, the method 500 may begin at 510. The general math model of the vehicle dynamics including the wheel dynamics as well as vehicle body dynamics is determined at 530. The controller design output is determined from 540 to 560. The available actuators are determined at 570 and the final solution is determined based thereon at 580. Thereafter, the method may end at 580.

Figure 6:
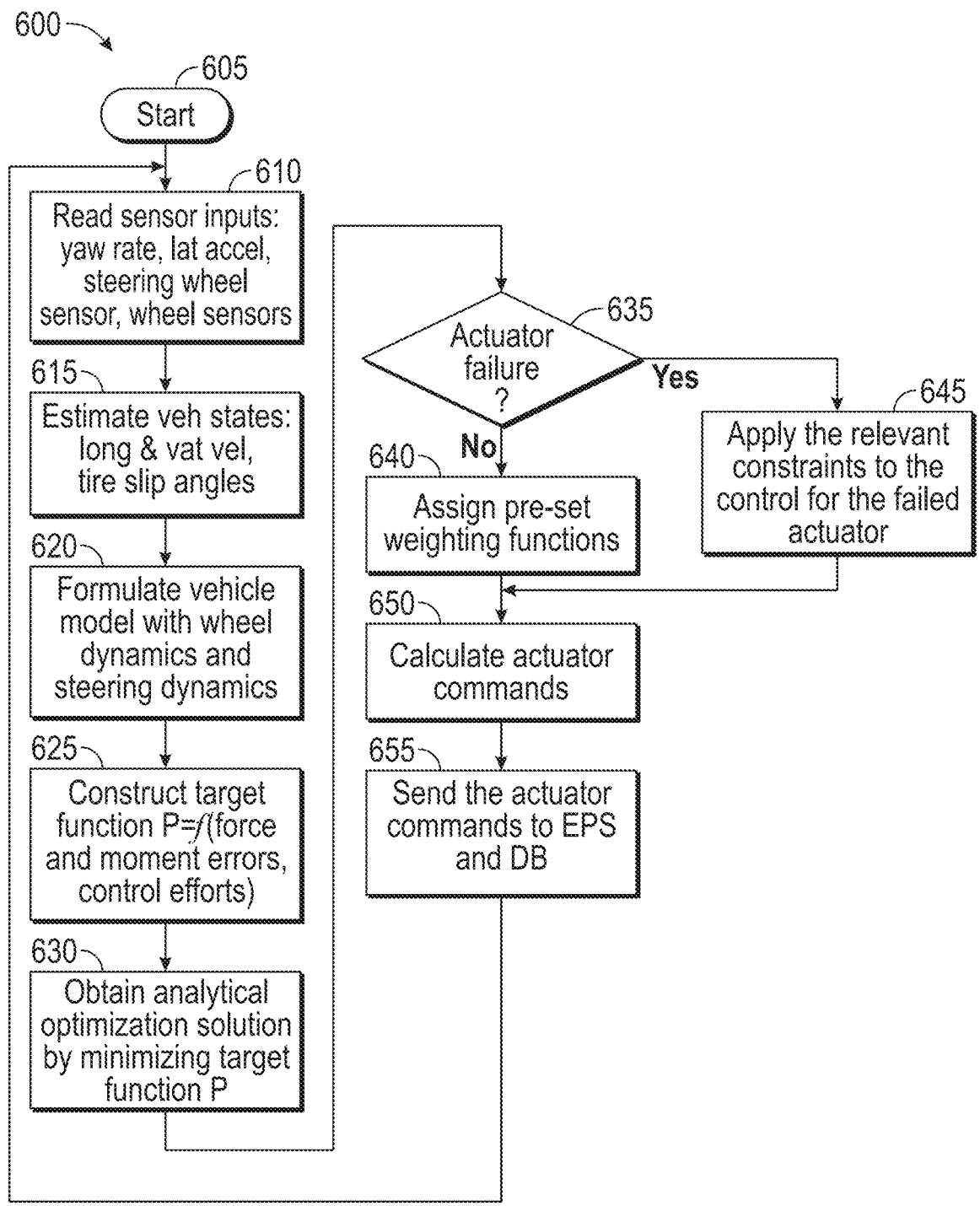
FIG. 6 is a flowchart illustrating control methods in accordance with various embodiments.

With a reference to FIG. 6, a flowchart is illustrated of the HVC method 600 which as explained earlier includes essentially three steps of: (1) from the sensor inputs to generate a model of vehicle and wheel dynamics as well as the relevant actuator dynamics for the wheel system systems, EPS and DB systems; (2) defining control goal by a target function which minimizes the error between desired and actual dynamics, and (3) determining the optimal solution by minimizing the target function for the available actuators including the EPS and DB systems. Initially, at 605 after the start, actuator commands are received by a feedback loop for controlling the EPS and DB systems. Then data from the sensor inputs is received and analyzed. At 610, the sensor inputs include data about the yaw rate, latest acceleration, EPS, steering column torque, steering wheel sensor and wheel sensors. At 615, the vehicle states of the longitudinal and latitude velocity as well as the tire forces and slip angles are estimated. As previously explained, the formula $I_{equ}\ddot{\delta} + C_{equ}\dot{\delta} + K_{equ}\delta = M_{driver} M_{EPS} M_{SAT}$ represents the relations of the self-aligning moment and lateral tire force. At 620, an object holistic model is formulated with wheel dynamics and steering dynamics by formulations of the vehicle planar motions and wheel dynamics. At 625, the HVC target function is constructed where the function is: p=f (force, moment errors as well as control efforts). The HVC target function includes EPS control including an actuator model and main vehicle model. At 630, analytical optimization solution is obtained by minimizing target function P of $\delta f = [W_{df} + A_f^T W_E A_f]^{-1} [A_f^T W_E E] |W_{df} + A_f^T W_E A_f| \neq 0$ that controls vehicle and wheel dynamics.

Next, at 635, a determination is made as to whether there is an actual actuator failure. If at 640, there is no failure detected, then pre-set weighting functions are assigned for the actuators for the EPS and DB systems. If there is actuator failure at 645, relevant constraints are applied to the control application of the failed actuator. At 650, the appropriate actuator commands are calculated. The actuator commands are then sent, at 655, to the EPS and DB systems, With continued reference to FIG. 6, and with references also to FIGS. 1 through 5, the flowcharts illustrate HVC methods for determining the adjusted command and controlling one or more components 16a-16n of the vehicle 12 based thereon. As can be appreciated in light of the disclosure, the order of operation within the HVC system is not limited to the sequential execution as illustrated in FIG. 6, but may be performed in one or more varying orders as applicable and in accordance with the present disclosure. As can further be appreciated, the HVC method 600 of FIG. 6 may be enabled to run continuously, may be scheduled to run at predetermined time intervals during operation of the vehicle 12 and/or may be scheduled to run based on predetermined events.

Further, in FIG. 6, in various embodiments, the yaw moment data and/or the longitudinal and/or the lateral forces data from the existing higher level controllers (e.g., $G^*_z$, $F^*_x$, $F^*_y$, etc.) at the CG level are received at 610. Based on the received data, the wheel moment adjustment commands are determined for each wheel at 625. The adjustment commands and any corrections may then be blended using the feed forward map to the corners and the inverse map to the CG at 630. Thereafter, the alternative blended commands may be sent to a lower level controller to assign the actuator level tasks at 650. The lower level control then generates control signals to control the actuators based thereon at 650. Thereafter, the method may end at 655.

Figure 7:
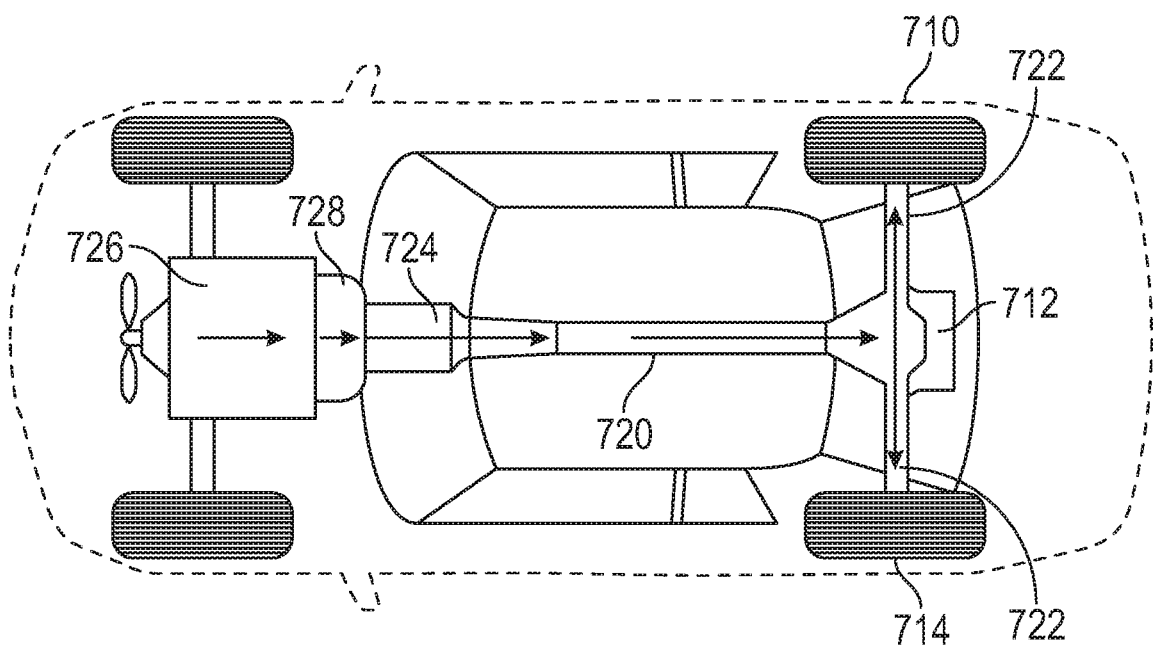
FIG. 7 is a diagram of a powertrain, eLSD and brake layout in accordance with various embodiments.
Figure 8:
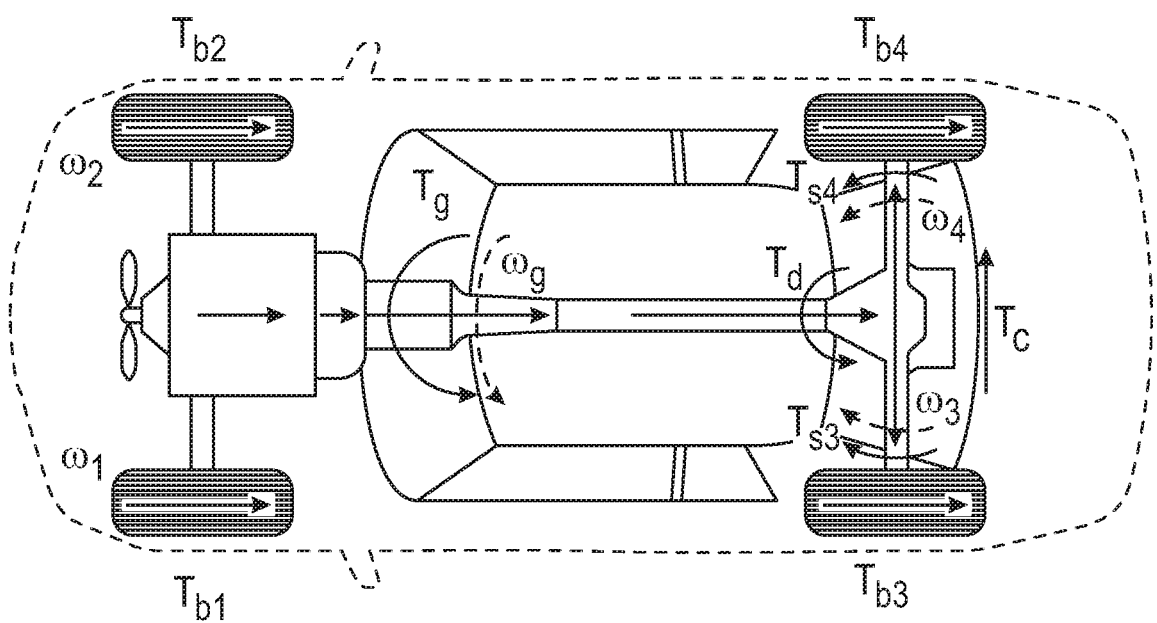
FIG. 8 is a diagram of vehicle forces with the powertrain, eLSD, and brake in accordance with various embodiments.

With a reference to FIG. 7, a vehicle 710 is provided having an eLSD 712 that selectively distributes torque from the engine 726 transmitted by a torque converter 728 via gears of the transmission 724 to a pair of wheels 714. The eLSD 712 is controlled by the HVC system (not shown) directly or indirectly through other control systems. The HVC system may provide control signals to a hydraulic pump (not shown) to supply hydraulic pressure to a clutch pack of the eLSD 712. As more pressure is provided in the clutch pack (not shown), gears in the eLSD dictate torques applied to the central drive shaft 720 and propeller shaft 722. Control of the eLSD by the HVC system will performed to maintain vehicle stability by utilizing analytical solutions achieved from optimal solutions for the available actuators and include actuators from the eLSD 712, brakes and power-train components With a reference to FIG. 8, the torques and forces with the power-train, eLSD and brake are illustrated for the HVC control system. The $T_{b1}$, $T_{b2}$, $T_{b3}$, and $T_{b4}$ are the torque forces transferred to each of the wheels. $T_g$ is the torque transferred from the transmission gears to the rear propeller shaft where $T_d$ is the torque transferred through the differential gears, and $T_C$ is the torque transferred through the clutch controlled by the HVC control system. The torque transferred through the differential gears $T_d$ is equally distributed to the left and right axle as $T_{s3}$ and $T_{s4}$. The speed of the shafts of the wheels is represented by $\omega_1$, $\omega_2$, $\omega_3$ and $\omega_4$ where $\omega_3$ and $\omega_4$ are shown as the speed transferred by the propeller shaft. The speed of the main shaft is represented by $\omega_g$.

Figure 9:
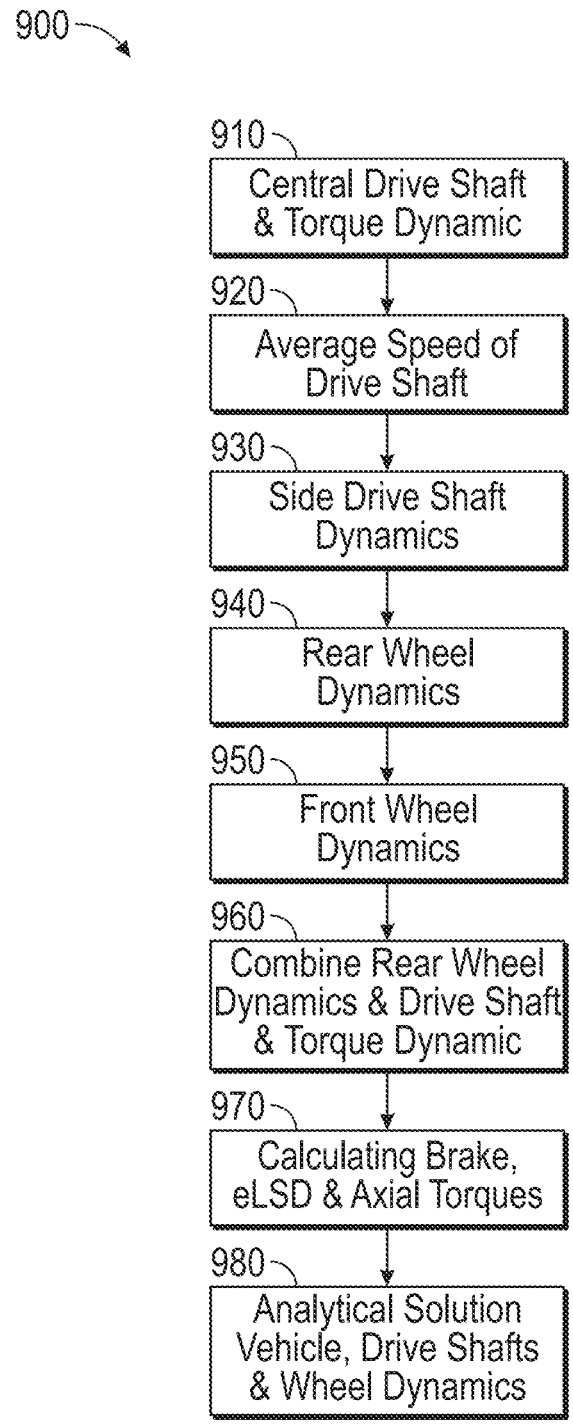
FIG. 9 is a flowchart illustrating control methods in accordance with various embodiments.

With a reference to FIG. 9 in various embodiments the holistic vehicle computer dynamic model with power-train, eLSD and brake dynamics is formulated.

At 910, the central drive shaft speed and torque dynamic is as follows:

$$\bar{J}_{in}\dot{\omega}_g = T_g - \frac{1}{n}T_d \quad \text{(Central Drive Shaft Dynamics)} \quad \text{[Equ. 1]}$$

n: differential gear-ratio, $$\bar{J}_{in} = J_{in} + \frac{1}{n^2}J_d,$$

$J_{in}$, $J_d$: are moments of inertia for differential case and drive shaft

At 920, an average speed of the drive shaft is computed.

$$\omega_g = \frac{n}{2}(\omega_3 + \omega_4) \quad \text{[Equ. 2]}$$

At 930, side drive shaft dynamics are computed.

$$\begin{cases} J_{s3}\dot{\omega}_3 = \frac{1}{2}(T_d - T_c \times \text{sgn}(\omega_3 - \omega_4)) - T_{s3} \\ J_{s4}\dot{\omega}_4 = \frac{1}{2}(T_d + T_c \times \text{sgn}(\omega_3 - \omega_4)) - T_{s4} \end{cases} \quad \text{Equ. 3]}$$

(Side Drive Shaft Dynamics)

At 940, rear wheel dynamics are computed.

$$\begin{cases} J_{w3}\dot{\omega}_3 = T_{s3} - T_{b3} - R_3 \times f_{x3} \\ J_{w4}\dot{\omega}_4 = T_{s4} - T_{b4} - R_4 \times f_{x4} \end{cases} \text{(Rear Wheels Dynamics)} \quad \text{[Equ. 4]}$$

At 950, front wheel dynamics are computed.

$$\begin{cases} J_{w1}\dot{\omega}_1 = -T_{b1} - R_1 \times f_{x1} \\ J_{w2}\dot{\omega}_2 = -T_{b2} - R_2 \times f_{x2} \end{cases} \text{(Front Wheels Dynamics)} \quad \text{[Equ. 5]}$$

At 960 with combinations of Equ. 1 to Equ. 4 and $$\begin{cases} \bar{J}_{w3}\dot{\omega}_3 = \frac{1}{2}(T_d - T_c \times \text{sgn}(\omega_3 - \omega_4)) - T_{b3} - R_3 \times f_{x3} \\ \bar{J}_{w4}\dot{\omega}_4 = \frac{1}{2}(T_d + T_c \times \text{sgn}(\omega_3 - \omega_4)) - T_{b4} - R_4 \times f_{x4} \end{cases} \quad \text{[Equ. 6]}$$

(Rear Wheels Dynamics)

Where $$\bar{J}_{w3} = J_{w3} + J_{s3}$$
$$\bar{J}_{w4} = J_{w4} + J_{s4}$$

$$T_d = nT_g - \bar{J}_{in}\frac{n^2}{2}(\dot{\omega}_3 + \dot{\omega}_4)$$

$$\begin{cases} J_{w1}\dot{\omega}_1 = -T_{b1} - R_1 \times f_{x1} \\ J_{w2}\dot{\omega}_2 = -T_{b2} - R_2 \times f_{x2} \end{cases} \quad \text{[Equ. 5, repeated]}$$

(Front Wheels Dynamics)

$$\begin{cases} \left(\bar{J}_{w3} + \frac{n^2}{4}\bar{J}_{in}\right)\dot{\omega}_3 + \frac{n^2}{4}\bar{J}_{in}\dot{\omega}_4 = \frac{n}{2}T_g - \\ \quad \frac{1}{2}(T_c \times \text{sgn}(\omega_3 - \omega_4)) - T_{b3} - R_3 \times f_{x3} \\ \frac{n^2}{4}\bar{J}_{in}\dot{\omega}_3 + \left(\bar{J}_{w4} + \frac{n^2}{4}\bar{J}_{in}\right)\dot{\omega}_4 = \frac{n}{2}T_g + \\ \quad \frac{1}{2}(T_c \times \text{sgn}(\omega_3 - \omega_4)) - T_{b4} - R_4 \times f_{x4} \end{cases} \quad \text{[Equ. 7]}$$

$$\begin{cases} J_{w1}\dot{\omega}_1 = -T_{b1} - R_1 \times f_{x1} \\ J_{w2}\dot{\omega}_2 = -T_{b2} - R_2 \times f_{x2} \end{cases} \quad \text{[Equ. 5, repeated]}$$

(Front Wheels Dynamics)

At 970 Solving for $f_{xi}$ $$\begin{cases} f_{x1} = \frac{1}{R_1}(-T_{b1} - J_{w1}\dot{\omega}_1) \\ f_{x2} = \frac{1}{R_2}(-T_{b2} - J_{w2}\dot{\omega}_2) \end{cases} \quad \text{[Equ. 8]}$$

$$\begin{cases} f_{x3} = \frac{1}{R_3}\left(\frac{n}{2}T_g - \frac{1}{2}T_c \times \text{sgn}(\omega_3 - \omega_4) - \left(\bar{J}_{w3} + \frac{n^2}{4}\bar{J}_{in}\right)\dot{\omega}_3 - \frac{n^2}{4}\bar{J}_{in}\dot{\omega}_4 - T_{b3}\right) \\ f_{x4} = \frac{1}{R_4}\left(\frac{n}{2}T_g + \frac{1}{2}T_c \times \text{sgn}(\omega_3 - \omega_4) - \left(\bar{J}_{w4} + \frac{n^2}{4}\bar{J}_{in}\right)\dot{\omega}_4 - \frac{n^2}{4}\bar{J}_{in}\dot{\omega}_3 - T_{b4}\right) \end{cases} \quad \text{[Equ. 9]}$$

the HVC controller module is defined similarly for the expanded actuator set of the powertrain, eLSD and brake models for the mathematical model which minimizes the error between desired dynamics and actual dynamics. The total tire force vector is:

$$f = \{f_{x1}, f_{y1}, f_{x2}, f_{y2}, f_{x3}, f_{y3}, f_{x4}, f_{y4}\}^T,$$

$$u = \{T_{b1}, T_{b2}, T_{b3}, T_{b4}, T_c, T_g\}^T$$

The CG force error vector then is:

$$E = [E_x, E_y, E_z, E_{w1}, E_{w2}, E_{w3}, E_{w4}]^T = \ldots [F^*_x - F_x, F^*_y - F_y, G^*_z - G_z, G^*_{w1} - G_{w1}, G^*_{w2} - G_{w2}, G^*_{w3} - G_{w3}, G^*_{w4} - G_{w4}]^T$$

The CG force error adjusted is:

$$P = \tfrac{1}{2}(E - A_F \delta f)^T W_E (E - A_F \delta f) + \tfrac{1}{2}(\delta f)^T W_{df}(\delta f)$$

At 980, the analytical solution is achieved that controls vehicles, drive shafts and wheels dynamics is:

$$\delta f = [W_{df} + A_f^T W_E A_f]^{-1} [A_f^T W_E E]$$

$$|W_{df} + A_f^T W_E A_f| \neq 0$$

Figure 10:
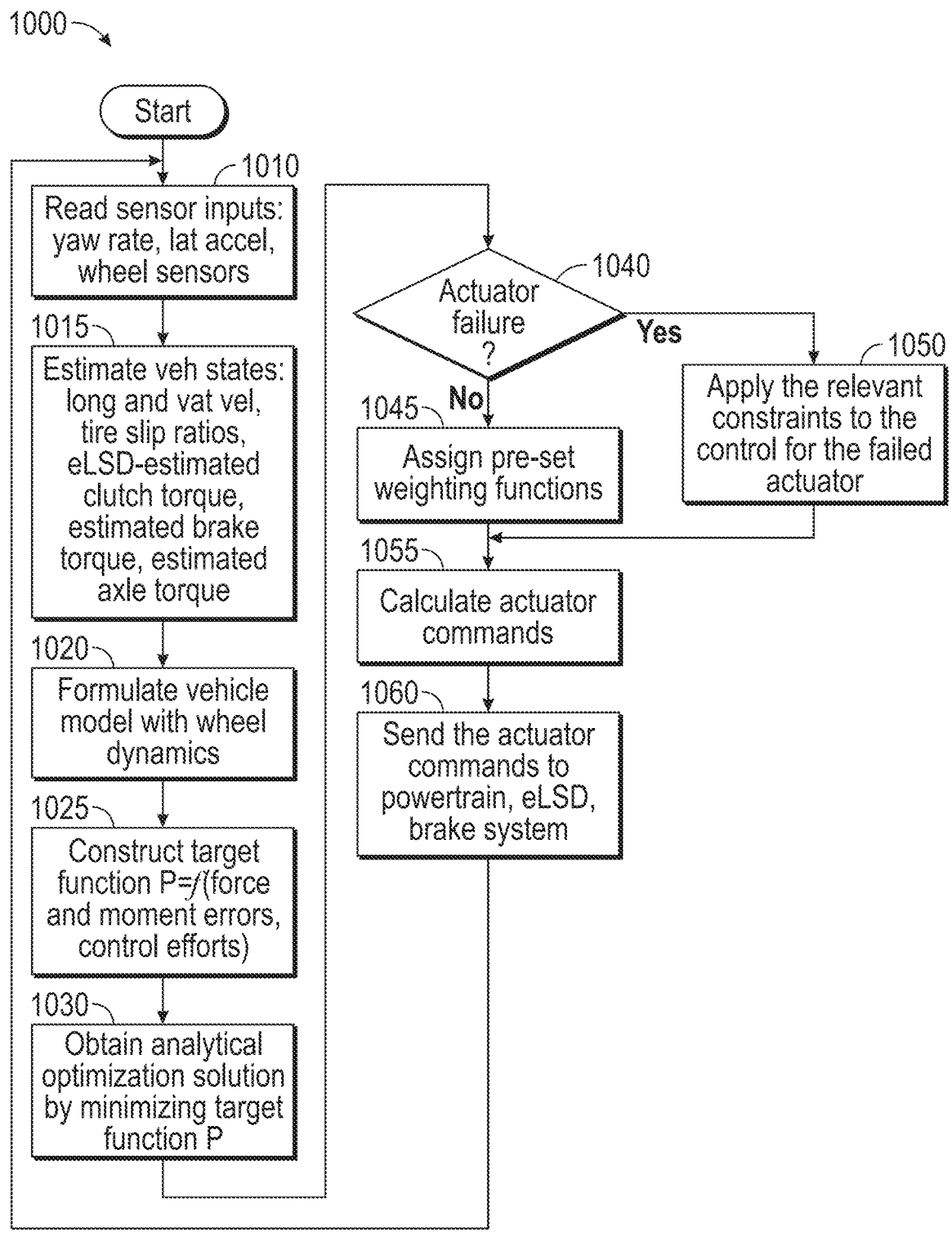
FIG. 10 is a flowchart illustrating control methods in accordance with various embodiments.

With a reference to FIG. 10, a flowchart of various embodiments of the HVC system for the expanded actuator that controls the vehicle, drive shafts and wheel dynamics is illustrated. The flowchart as explained earlier includes essentially three steps of: (1) from the sensor inputs to generate a model of vehicle and wheel dynamics as well as the relevant actuator dynamics which are the for the wheel system systems (wheels, powertrain, eLSD and brake systems); (2) defining control goal by a target function which minimizes the error between desired and actual dynamics; and (3) determining the optimal solution by minimizing the target function for the available actuators including the eLSD, brakes, and powertrain. Initially, at 1010 after the start, actuator commands are received by a feedback loop for controlling the eLSD, powertrain, and brake systems. Then data from the sensor inputs is received and analyzed. At 1015, the sensor inputs include data about the yaw rate, latest acceleration, and wheel sensors. At 1015, the vehicle states of the longitudinal and latitude velocity as well as the tire slip ratios, eLSD, clutch torque, brake torque, and axle torque are estimated. As previously explained, the formula $I_{equ}\ddot{\delta} + C_{equ}\dot{\delta} + K_{equ}\delta = M_{driver} \, M_{EPS} \, M_{SAT}$ represents the relations of the self-aligning moment and lateral tire force. At 1020, an object holistic model is formulated with wheel dynamics by formulations of the vehicle planar motions and wheel dynamics. At 1025, the HVC target function is constructed where the function is: p=f (force, moment errors as well as control efforts). The HVC target function includes vehicle, drive shaft and wheel dynamic control including an actuator model and main vehicle model. At 1030, analytical optimization solution is obtained by minimizing target function P of $\delta f = [W_{df} + A_f^T W_E A_f]^{-1} [A_f^T W_E E] | W_{df} + A_f^T W_E A_f| \neq 0$ that controls vehicle and wheel dynamics.

Next, at 1040, a determination is made as to whether there is an actual actuator failure. If at 1045, there is no failure detected, then pre-set weighting functions are assigned for the actuators for the eLSD, powertrain and braking systems. If there is actuator failure at 1050, relevant constraints are applied to the control application of the failed actuator. At 1055, the appropriate actuator commands are calculated. The actuator commands are then sent, at 1060, to the eLSD, powertrain and braking systems, With continued reference to FIG. 10, and with references also to FIGS. 1-4 and 7-9, the flowcharts illustrate HVC methods for determining the adjusted command and controlling one or more components 16*a*-16*n* of the vehicle 12 based thereon. As can be appreciated in light of the disclosure, the order of operation within the HVC system is not limited to the sequential execution as illustrated in FIG. 10, but may be performed in one or more varying orders as applicable and in accordance with the present disclosure. As can further be appreciated, the HVC method 1000 of FIG. 10 may be enabled to run continuously, may be scheduled to run at predetermined time intervals during operation of the vehicle 12 and/or may be scheduled to run based on predetermined events.

Further, in FIG. 10, in various embodiments, the yaw moment data and/or the longitudinal and/or the lateral forces data from the existing higher level controllers (e.g., $G^*_z$, $F^*_x$, $F^*_y$, etc.) at the CG level are received at 1010. Based on the received data, the wheel moment adjustment commands are determined for each wheel at 1025. The adjustment commands and any corrections may then be blended using the feed forward map to the corners and the inverse map to the CG at 1030. Thereafter, the alternative blended commands may be sent to a lower level controller to assign the actuator level tasks at 1055. The lower level control then generates control signals to control the actuators based thereon at 1055. Thereafter, the method may end at 1060.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle to improve vehicle dynamics with a holistic vehicle control (HVC) system, the method comprising:
   receiving data from a plurality of sensors which monitor vehicle dynamics by monitoring at least wheel movements associated with a vehicle system used in controlling vehicle dynamics by control outputs from the HVC system;
   estimating states of the vehicle from computations of one or more of longitudinal and latitudinal velocities, yaw rate and slip angles derived from the data sensed by the sensors from the wheel and/or steering movements; and
   formulating a model of vehicle dynamics by using estimations of vehicle states with a target function to provide analytical data to enable the model of vehicle dynamics to be optimized and for using the data associated with the model which has been optimized to change control outputs of the HVC system to improve in real-time the vehicle dynamics;
   wherein the formulating comprises generating the model of vehicle dynamics with six degrees of freedom of $F_x$, $F_y$, $F_z$, $G_x$, $G_y$, $G_z$ and with an objective solution for minimizing a set of error components based on changes in a slip angle, a lateral tire acceleration and angular moment taking into account a set of actuator efforts and constraints derived from the angular moment and the changes in slip angle of the vehicle;
   wherein the set of error components is balanced with respect to results of the actuator efforts and the actuator constraints by algorithmic solutions of the HVC system of a vehicle target dynamics and a path derived from the lateral tire acceleration, the angular moment, an error vector, the slip angle, the changes in the slip angle, and a slip angle error of the vehicle.

2. The method of claim 1, wherein the control outputs comprise selectively controlling at least one actuator associated with the HVC system wherein the HVC system comprises one or more of a wheel control system, a powertrain and a steering control system.

3. The method of claim 2, wherein the control outputs comprise actuator commands generated by the HVC system for controlling at least one of the actuators of the vehicle system.

4. The method of claim 3, wherein in the vehicle system comprises one or more of an electronic power steering (EPS) system, a differential braking (DB) system, an electronic limited slip differential (eLSD) system, and a braking system.

5. The method of claim 2, further comprising:
generating the model for vehicle dynamics including dynamics of each wheel of a set of wheels of a vehicle and a set of dynamics of a vehicle body of an expanded planar model comprising three degrees of freedom of $F_x$, $F_y$, and $G_z$.

6. The method of claim 5, further comprising determining the available actuators is based on a failure condition associated with at least one actuator.

7. The method of claim 6, wherein the holistic vehicle control system comprises:
applying constraints to a set of controls of the HVC system for an actuator determined to have the failure condition; and
applying pre-set weighting functions to actuators determined not to have the failure condition.

8. The method of claim 1, wherein the control output minimizes an error between desired dynamics and actual dynamics.

9. The method of claim 1, wherein the formulating the model comprises formulating the mode of vehicle dynamics based on the target function, wherein the target function is a HVC target function associated with vehicle dynamics, wherein the control output comprises results from the model of vehicle dynamics which has been optimized for the vehicle associated with one or more of the following vehicle system data of a wheel, a steering, an eLSD, a braking and a powertrain system.

10. A system for controlling a component of a vehicle, comprising:
a non-transitory computer readable medium comprising:
a first module that generates, by a processor, a model of vehicle dynamics based on sensor information;
a second module that determines, by a processor, a control output based on the model of vehicle dynamics for values computed by a target function of wheel dynamics and controls of actuators;
wherein the model of vehicle dynamics has six degrees of freedom of: $F_x$, $F_y$, $F_z$, $G_x$, $G_y$, $G_z$ and an objective function to minimize a set of error components based on changes in a slip angle, a lateral tire acceleration and angular moment taking into account a set of actuator efforts and constraints derived from the angular moment and the changes in slip angle of the vehicle;
wherein the set of error components is balanced with respect to results of the actuator efforts and the actuator constraints by algorithmic solutions of the HVC system of a vehicle target dynamics and a path derived from the lateral tire acceleration, the angular moment, an error vector, the slip angle, the changes in the slip angle, and a slip angle error of the vehicle; and
a third module that selectively controls, by a processor, at least one component associated with at least one of the actuators of a wheel, eLSD, powertrain, braking or steering system of the vehicle based on the control output in accordance with the algorithmic solution.

11. The system of claim 10, further comprising a fourth module that determines available actuators of at least one of the wheel, eLSD, powertrain, braking and steering system, and wherein the second module determines the control output based on the available actuators.

12. The system of claim 11, wherein the fourth module determines the available actuators based on a fault condition associated with at least one of the actuators.

13. The system of claim 11, wherein the control output minimizes an error between desired dynamics and actual dynamics.

14. The system of claim 11, wherein the target function includes force and moment errors associated with the vehicle dynamics.

15. The system of claim 11, wherein the wheel dynamics includes at least tire slip.

16. A system comprising:
at least one processor; and
at least one computer-readable storage device comprising instructions that when executed causes performance of a method or modeling vehicle dynamics, the method comprising:
receiving data from a plurality of sensors which monitor vehicle dynamics by monitoring at least wheel and steering movements associated with a vehicle system used in controlling vehicle dynamics by control outputs from a holistic vehicle control system;
estimating states of the vehicle from computations of one or more of the following: longitudinal and latitudinal velocities; clutch torque, eLSD, brake torque, axle torque, tire slip ratios and slip angles derived from the data sensed by the sensors from the wheel and/or steering movements; and
formulating a model of vehicle dynamics by using estimations of vehicle states with a target function to provide analytical data to enable the model of vehicle dynamics to be optimized and for using the data associated with the model which has been optimized to change control outputs of the holistic vehicle control system to improve in real-time the vehicle dynamics;
wherein the formulating comprises generating the model of vehicle dynamics with six degrees of freedom of $F_x$, $F_y$, $F_z$, $G_x$, $G_y$, $G_z$ and with an objective solution for minimizing a set of error components based on changes in a slip angle, a lateral tire acceleration and angular moment taking into account a set of actuator efforts and constraints derived from the angular moment and the changes in slip angle of the vehicle;
wherein the set of error components is balanced with respect to results of the actuator efforts and the actuator constraints by algorithmic solutions of the HVC system of a vehicle target dynamics and a path derived from the lateral tire acceleration, the angular moment, an error vector, the slip angle, the changes in the slip angle, and a slip angle error of the vehicle.

17. The method of claim 16, wherein the control outputs comprise selectively controlling at least one actuator associated with the holistic vehicle control system wherein the holistic vehicle control system comprises at least a wheel control system and/or a steering control system.

18. The method of claim 17, wherein the control outputs comprise actuator commands generated by the holistic vehicle control system for controlling at least one of the actuators of the vehicle system.

19. The method of claim 18, where in the vehicle system comprises one or more of an electronic power steering (EPS) system, a differential braking (DB) system, an electronic limited slip differential (eLSD) system, and a braking system.

20. The method of claim 16, wherein the formulating the model comprises formulating the model of vehicle dynamics based on the target function, wherein the target function is associated with vehicle dynamics, wherein the control output comprises results from the model of vehicle dynamics which has been optimized for the vehicle associated with one or more of the following vehicle system data of a wheel, a steering, an eLSD, a braking and a powertrain system, and wherein the method further comprises controlling at least one component associated with at least a vehicle system of the vehicle based on the respective control output.

\* \* \* \* \*